United States Patent [19]
Wilcox

[11] Patent Number: 5,099,381
[45] Date of Patent: Mar. 24, 1992

[54] ENABLE CIRCUIT WITH EMBEDDED THERMAL TURN-OFF

[75] Inventor: Milton E. Wilcox, Saratoga, Calif.

[73] Assignee: National Semiconductor Corporation, Santa Clara, Calif.

[21] Appl. No.: 433,555

[22] Filed: Nov. 8, 1989

[51] Int. Cl.[5] .............................................. H02H 9/04
[52] U.S. Cl. .................................. 361/103; 307/310; 323/907; 361/91
[58] Field of Search ............... 361/98, 101, 103, 18, 361/56, 91, 103; 307/310, 350, 359, 360, 565, 567; 323/907

[56] References Cited

U.S. PATENT DOCUMENTS

| | | | |
|---|---|---|---|
| 3,558,987 | 1/1971 | Lewis | 361/103 X |
| 3,638,049 | 1/1972 | Bom | 307/310 |
| 3,809,929 | 5/1974 | Vittoz | 307/310 |
| 3,825,778 | 7/1974 | Ahmed | 307/310 |
| 4,207,481 | 6/1980 | Dobkin | 307/310 |
| 4,667,265 | 5/1987 | Stanojevic et al. | 361/103 |
| 4,701,639 | 10/1987 | Stanojevic | 307/350 |
| 4,750,079 | 6/1988 | Foy et al. | 361/103 X |
| 4,779,161 | 10/1988 | De Shazo, Jr. | 361/106 |
| 4,789,819 | 12/1988 | Nelson | 323/907 X |

*Primary Examiner*—Howard L. Williams
*Attorney, Agent, or Firm*—Limbach & Limbach

[57] ABSTRACT

An enable circuit that integrates thermal shutdown capability. The enable circuit utilizes a temperature insensitive threshold detector network that provides a desired biasing current when the ON/OFF signal applied at its input exceeds a preselected voltage. Thermally sensitive circuitry connected between the input of the threshold detector network and ground remains off when the ON/OFF signal is equal to the preselected voltage and the temperature of the enable circuit is below a preselected maximum temperature. However, when the temperature of the enable circuit reaches the preselected maximum temperature, the thermally sensitive circuitry turns on, clamping the input signal to the threshold detector network below the preselected voltage.

6 Claims, 2 Drawing Sheets

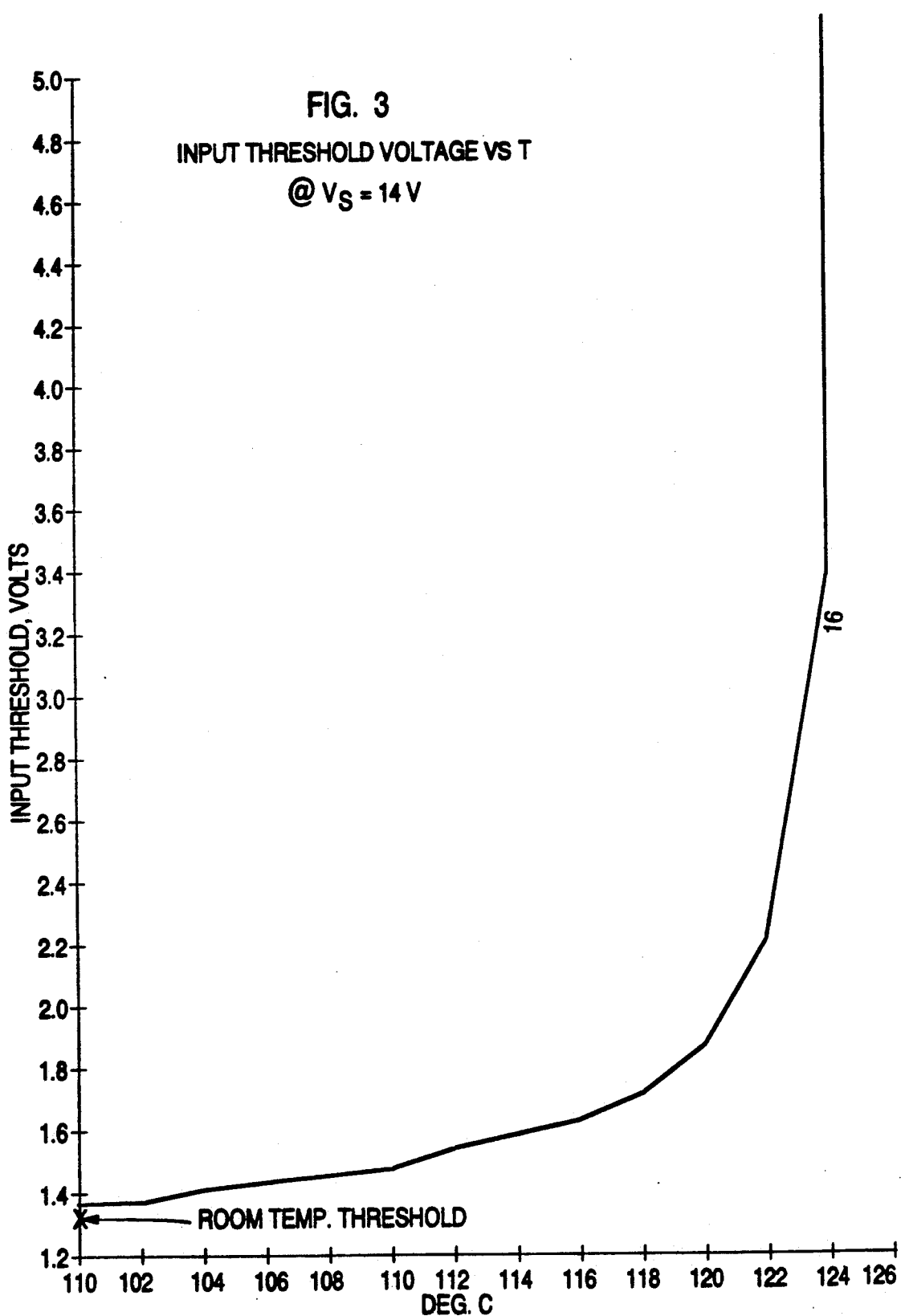

ENABLE CIRCUIT WITH EMBEDDED THERMAL TURN-OFF

BACKGROUND OF THE INVENTION

1. Field of the Invention

The present invention relates generally to electronic circuits and, in particular, to an enable circuit that integrates thermal shutdown capability.

2. Discussion of the Prior Art

Enable circuits for providing biasing current to an associated integrated circuit (IC) are well known. Typically, in addition to meeting their primary function of providing drive to the associated IC in response to assertion of an on/off input signal, enable circuits are also designed to minimize standby current when the input signal is off.

Conventional integrated circuits minimize current draw from the supply by disconnecting the supply when the integrated circuit is off. However, there may be applications which require that the supply remain connected even though the particular integrated circuit is not in use. For example, in automobiles it is desirable to connect numerous circuits directly to the battery so that each of these circuits may be used when the ignition switch is turned off. These circuits must be designed to draw low standby current to prevent battery discharge when the car is not driven for extended periods of time.

In addition to providing for minimized standby current, it is also desirable to provide thermal shutdown capability for the integrated circuit if its temperature exceeds a predefined threshold. Thermal shutdown is necessary because of performance drifts in the circuit when the temperature threshold is exceeded.

To achieve thermal shutdown of a particular integrated circuit typically requires utilization of a dedicated thermal shutdown circuit separate from the integrated circuit to be protected. The separate thermal shutdown circuit monitors temperature and shuts the integrated circuit off when its temperature exceeds the predefined threshold. While usually located on the same chip as the integrated circuit to be protected, the thermal shutdown circuit is often as complex as the enable circuit itself. Typically, the thermal shutdown circuit is connected to the output of the enable circuit to override that output when the threshold temperature is exceeded. These separate thermal shutdown circuits require additional die area, thereby decreasing yield and increasing product cost.

SUMMARY OF THE INVENTION

The present invention overcomes the limitations of the prior art by providing an enable circuit that utilizes a minimum number of integrated components and which additionally provides embedded thermal shutdown above a well-defined temperature. The circuit draws no supply current when the input is off and has a well-defined and relatively temperature stable turn-on threshold with hysteresis.

An enable circuit in accordance with the present invention includes a temperature insensitive threshold detector network that provides a desired biasing current when an ON/OFF signal applied at its input exceeds a preselected voltage. Thermally sensitive circuitry connected between the input of the threshold detector network and ground remains off when the temperature of the enable circuit is below a preselected maximum temperature and, thus, does not impact upon the normal operation of the enable circuit. However, when the temperature of the enable circuit reaches the preselected maximum temperature, the thermally sensitive circuitry turns on, clamping the input of the threshold detector network to below the preselected voltage.

In the disclosed embodiment of the invention, the core of the threshold detector network is a Brokaw cell used in an open-loop configuration. An inherent feature of a Brokaw cell is that it draws no current when its input is off. The thermally sensitive circuitry is disclosed as either a diode string or a $V_{BE}$ multiplier. A current regulator connected between the input of the Brokaw cell and ground shunts excess input current to ground. A switching network connected to the Brokaw cell provides both ON/OFF voltage hysteresis and thermal turn-off hysteresis.

The foregoing and additional features and advantages of the present invention will be more fully understood and appreciated upon consideration of the following detailed description of the invention, which should be considered in conjunction with the accompanying drawings.

BRIEF DESCRIPTION OF THE DRAWINGS

FIG. 3 is a graph illustrating the thermal shutdown characteristics of the circuit shown in FIG. 1.

DETAILED DESCRIPTION OF THE INVENTION

Figures 1, 2:
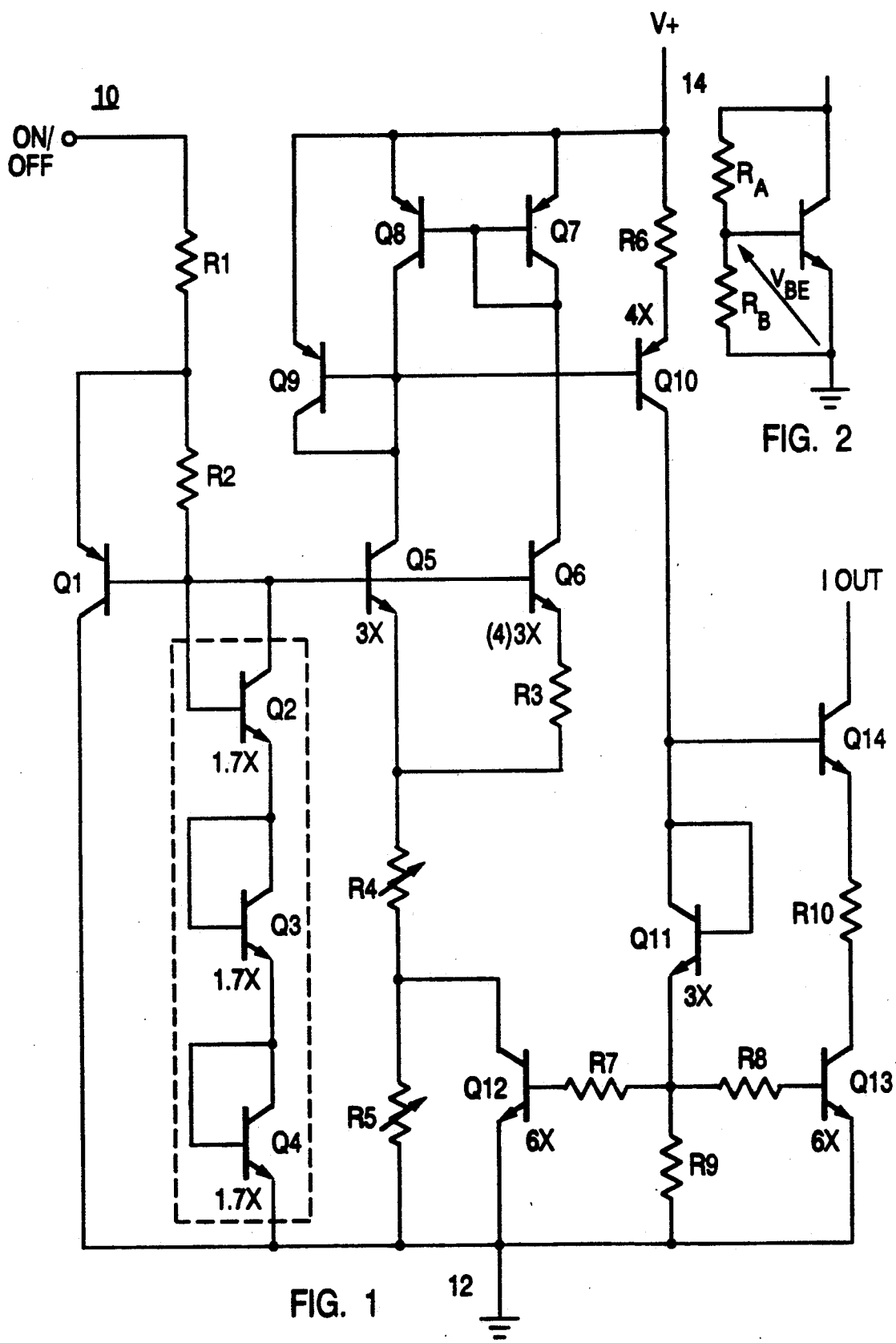
FIG. 1 is a schematic diagram illustrating an embodiment of an enable circuit with embedded thermal shutdown in accordance with the present invention.
FIG. 2 is a schematic diagram illustrating a $V_{BE}$ multiplier which may be substituted for the diode string shown in FIG. 1.

FIG. 1 shows a schematic diagram of an embodiment of an enable circuit 10 with embedded thermal shutdown in accordance with the present invention. The FIG. 1 circuit may be implemented in integrated circuit form using well known fabrication processes.

As shown in FIG. 1, an ON/OFF input signal is provided to the input terminal of the enable circuit 10. When on, the ON/OFF signal provides base drive to NPN transistors Q5 and Q6 via 50 Kohm input resistor R1 and 68 Kohm resistor R2. Transistors Q5 and Q6 are the input devices of a temperature insensitive threshold detector network configured as an open loop Brokaw cell that includes transistors Q5-Q8. That is, in addition to input transistors Q5 and Q6, the Brokaw cell also includes a current mirror comprising PNP transistors Q7 and Q8. The emitter of transistor Q6 is four times the size of the 3× emitter of transistor Q5.

A positive supply 14 is connected to the emitter of PNP transistor Q9, the commonly connected collector/base region of transistor Q9 being connected to the collector of transistor Q5. The 4× emitter of PNP transistor Q10 is connected to the positive supply 14 via 100 ohm resistor R6. The emitter of transistor Q5 is connected to ground via series-connected resistors R4 (3.9 Kohm) and R5 (1.5 Kohm). The emitter of transistor Q6 is connected to ground via 720 ohm resistor R3 in series with resistors R4 and R5.

The collector of NPN transistor Q12 is connected between resistors R4 and R5, while the 6× emitter of transistor Q12 is connected to ground. The collector of PNP transistor Q10 is connected both to the base of NPN output transistor Q14 and to the commonly-connected collector/base regions of NPN transistor Q11. The 3× emitter of transistor Q11 is connected to ground via a resistive network that includes 1 Kohm resistor R7, 2 Kohm resistor R8 and 20 Kohm resistor R9. The collector of NPN transistor Q13 is connected to the controlled current output IOUT of the enable circuit via 7.5 Kohm resistor R10 and output transistor Q14.

The ON/OFF terminal of enable circuit 10 is also connected via resistor R1 to ground terminal 12 through current regulating PNP transistor Q1.

In accordance with the present invention, and as discussed in greater detail below, thermally sensitive circuitry, shown in FIG. 1 as comprising three series-connected clamping diodes formed from NPN transistors Q2-Q4, connects the base drive signal of transistors Q5 and Q6, i.e. the input to the threshold detector network, to ground. Each of devices Q2-Q4 is fabricated to have a 1.7× emitter.

The core of the enable circuit is a Brokaw cell comprising transistors Q5-Q8 which is used as a threshold circuit network as taught by Stanojevic in U.S. Pat. No. 4,701,639 (which is commonly assigned herewith). However, in contrast to the threshold circuit described by Stanojevic, the Brokaw cell shown in FIG. 1 is used in an open loop configuration as has been suggested in the past. One of the inherent features of a Brokaw cell is that it draws no current when the ON/OFF input is below 1 $V_{BE}$ (where $V_{BE}$ = 0.7V). However, as the ON/OFF voltage increases above 1 $V_{BE}$, current begins to flow in transistors Q5 and Q6. Initially, the current in transistor Q6 exceeds the current in transistor Q5 due to the 4:1 emitter area ratio of the two transistors. Thus, transistor Q9 is held off. At the turn-on threshold of the Brokaw cell, the current in transistor Q5 equals the $\Delta V_{BE}$ resulting from the 4:1 area ratio of transistors Q5 and Q6 divided by the value of resistor R3 (720 ohms). This occurs at a threshold voltage at the base of transistor Q5 equal to 1 $V_{BE}$ plus the voltage drop across resistors R4 and R5 resulting from the sum of the currents flowing in transistors Q5 and Q6; in the FIG. 1 embodiment, this threshold voltage is about 1.2V.

When the turn-on threshold of the Brokaw cell is exceeded, PNP transistors Q9 and Q10 both turn on, causing switch devices Q12 and Q13 to also turn on. Switch transistor Q12 shorts out resistor R5 to provide hysteresis at the ON/OFF input to the threshold detector network, while switch transistor Q13 turns on an output current IOUT of approximate value $V_{BE}$/R10.

Since there is no feedback from the output of the Brokaw cell threshold detector network to its ON/OFF input, further increasing the ON/OFF voltage above the turn-on threshold would cause unnecessarily large currents to flow in transistor Q10. Therefore, 100 ohm degeneration resistor R6 has been added to the emitter of transistor Q10.

In accordance with the present invention, a 3 $V_{BE}$ clamp Q2-Q4 is added to the input of the threshold detector network. This clamp prevents saturation of transistors Q5 and Q6 when a high voltage is applied to the ON/OFF input and, additionally, provides the thermal turn-off characteristic of the enable circuit. As the temperature of the enable circuit 10 increases, the clamp voltage at the input of the threshold detector network drops due to the negative temperature coefficient of the clamp Q2-Q4. Since the threshold voltage set by the Brokaw cell is relatively temperature independent, at some temperature, the clamp voltage drops below the turn-off voltage for the Brokaw cell and the controlled output current IOUT is turned off.

Since, when transistor Q10 turns off, transistor Q12 also turns off, resistor R5 is restored to the circuit, increasing the threshold to turn transistor Q10 back on. Thus, resistor R5 and transistor Q12 serve to provide both ON/OFF voltage hysteresis and thermal turn-off hysteresis.

By using the 3 $V_{BE}$ clamp Q2-Q4, the values of resistors R4 and R5 required to provide the desired turn-off temperature and hysteresis also result in an on/off threshold fully compatible with TTL or CMOS input signals.

Transistor Q1 functions as a current regulator, shunting excess input current from resistor R1 to ground. This limits the Q2-Q4 clamp current to Vbe/R2, thereby accurately defining the turn-off temperature.

FIG. 2 shows alternative thermally sensitive circuitry, i.e. a $V_{BE}$ multiplier, which may be substituted for the diode string Q2-Q4 (shown within dotted lines in FIG. 1). The clamp voltage of the $V_{Be}$ multiplier is $(R_A \text{ and } R_B)/R_B$ times 1 $V_{BE}$, enabling a fractional $V_{BE}$ clamp to be obtained by adjusting the values of $R_A$ and $R_B$. The $V_{BE}$ multiplier would provide more adjustment of thermal shutdown, but resistors $R_A$ and $R_B$ would draw current from the ON/OFF input causing the threshold voltage to increase.

FIG. 3 provides a graph comparing the input threshold voltage of the enable circuit 10 versus temperature for an actual integrated circuit implementation of the FIG. 1 schematic. As shown in FIG. 3, at approx. 125° C., the turn-on threshold of the enable circuit is infinity, this representing thermal shutdown.

It should be understood that various alternatives to the embodiments of the invention described herein may be utilized in practicing the invention. It is intended that the following claims define the scope of the invention and that circuits within the scope of these claims and their equivalents be covered thereby.

What is claimed is:

1. An integrated enable circuit for providing a controlled output current, the enable circuit comprising:
   (a) a threshold circuit that provides the controlled output current when an ON/OFF input to the threshold circuit exceeds a predetermined threshold voltage, the threshold circuit including
      (i) first and second bipolar input transistors which operate at different current densities and which turn on in response to application of the predetermined threshold voltage;
      (ii) a current mirror coupled between the first and second input transistors and a positive supply; and
      (iii) switching means connected to the current mirror for providing the output biasing current when the current flowing in the first input transistor exceeds the current flowing in the second input transistor; and
   (b) an embedded clamping network connected between the ON/OFF input to the threshold circuit and ground for turning off the controlled output current when the temperature of the threshold circuit exceeds a preselected temperature.

2. An enable circuit as in claim 1 wherein the switching means includes third and fourth bipolar transistors having commonly-connected bases which are also connected to the collector of the first input transistor such that the first transistor controls current flow through the third and fourth transistors.

3. An enable circuit as in claim 2 wherein the switching means further includes:
    (a) a bipolar output transistor having its base connected to the collector of the fourth transistor; and
    (b) a bipolar switching transistor connected between the emitter of the output transistor and ground and having its base connected to the collector of the fourth transistor via an impedance;
    (c) whereby the output transistor provides the output biasing current when the fourth transistor turns on.

4. An enable circuit as in claim 1 wherein the clamping network comprises a plurality of diode-connected transistors.

5. An enable circuit as in claim 1 wherein the clamping network comprises a $V_{BE}$ multiplier that includes:
    (a) a bipolar clamping transistor having its collector connected to the ON/OFF input signal and its emitter connected to ground;
    (b) a first resistive element connected between the collector and the base of the clamping transistor; and
    (c) a second resistive element connected between the emitter and the base of the clamping transistor.

6. An integrated enable circuit for providing a controlled output current, the enable circuit comprising:
    (a) a threshold circuit that provides the controlled output current when an ON/OFF input to the threshold circuit exceeds a predetermined threshold voltage;
    (b) an embedded clamping network connected between the ON/OFF input to the threshold circuit and ground for turning off the controlled output current when the temperature of the threshold circuit exceeds a preselected temperature; and
    (c) a current regulator connected in parallel with the clamping network between the ON/OFF input signal and ground.

* * * * *